(12) United States Patent
Kostanic

(10) Patent No.: US 7,893,872 B2
(45) Date of Patent: Feb. 22, 2011

(54) METHOD AND APPARATUS FOR PERFORMING BLIND SIGNAL SEPARATION IN AN OFDM MIMO SYSTEM

(75) Inventor: Ivica Kostanic, Palm Bay, FL (US)

(73) Assignee: InterDigital Technology Corporation, Wilmington, DE (US)

( * ) Notice: Subject to any disclaimer, the term of this patent is extended or adjusted under 35 U.S.C. 154(b) by 901 days.

(21) Appl. No.: 11/739,181

(22) Filed: Apr. 24, 2007

(65) Prior Publication Data
US 2007/0253505 A1 Nov. 1, 2007

Related U.S. Application Data

(60) Provisional application No. 60/795,298, filed on Apr. 27, 2006.

(51) Int. Cl.
*G01S 3/16* (2006.01)

(52) U.S. Cl. .................. 342/378; 375/260; 375/267; 375/316; 375/130; 342/373; 706/20; 706/190

(58) Field of Classification Search ........... 375/316, 375/267, 260; 702/190; 706/20, 190; 708/205; 704/233; 455/306; 342/378, 373; 250/282
See application file for complete search history.

(56) References Cited

U.S. PATENT DOCUMENTS

| | | | | |
|---|---|---|---|---|
| 6,799,170 B2* | 9/2004 | Lee et al. | ............. | 706/20 |
| 6,931,362 B2* | 8/2005 | Beadle et al. | ............. | 702/190 |
| 7,116,271 B2* | 10/2006 | Kostanic et al. | ............. | 342/378 |
| 7,225,124 B2* | 5/2007 | Deligne et al. | ............. | 704/233 |
| 7,450,924 B1* | 11/2008 | Mostafa et al. | ............. | 455/306 |
| 2005/0105644 A1* | 5/2005 | Baxter et al. | ............. | 375/316 |
| 2006/0058983 A1* | 3/2006 | Araki et al. | ............. | 702/190 |
| 2008/0215651 A1* | 9/2008 | Sawada et al. | ............. | 708/205 |
| 2009/0001262 A1* | 1/2009 | Visser et al. | ............. | 250/282 |

OTHER PUBLICATIONS

Oja et al.; Independent Component Analysis: A Tutorial; pp. 1-29; Apr. 1999.*

IEEE, "IEEE P802.11n/D0.03 Draft Amendment to Standard [FOR] Information Technology—Telecommunications and Information Exchange Between Systems—Local and Metropolitan Networks—Specific Requirements—Part 11: Wireless LAN Medium Access Control (MAC) and Physical Layer (PHY) Specifications: Enhancements for Higher Throughput", (Mar. 2006).

(Continued)

*Primary Examiner*—Sudhanshu C Pathak
(74) *Attorney, Agent, or Firm*—Volpe and Koenig, P.C.

(57) ABSTRACT

A method and apparatus for performing blind signal separation in an orthogonal frequency division multiplexing (OFDM) multiple-input multiple-output (MIMO) system are disclosed. A transmitter generates a plurality of spatial streams of data and transmits the spatial streams via a plurality of transmit antennas. A receiver receives the transmitted spatial data streams with a plurality of receive antennas and generates a plurality of receive data streams. The receiver performs a discrete Fourier transform (DFT) on each of the receive data streams to generate a plurality of frequency domain data streams. The receiver then performs a blind signal separation on the frequency domain data streams to recover spatial streams transmitted by the transmitter. The blind signal separation may be performed by using an independent component analysis (ICA) in the complex domain. The blind signal separation may be performed individually for each OFDM subcarrier.

8 Claims, 4 Drawing Sheets

OTHER PUBLICATIONS

IEEE, "IEEE P802.11n/D2.00 Draft Standard for Information Technology—Telecommunications and Information on Exchange Between Systems—Local and Metropolitan Area Networks—Specific Requirements—Part 11: Wireless LAN Medium Access Control (MAC) and Physical Layer (PHY) Specifications: Amendment <number>: Enhancements for Higher Throughput", (Feb. 2007).

Obradovic et al., "Independent Component Analysis for Semi-Blind Signal Separation in MIMO Mobile Frequency Selective Communication Channels", IEEE International Joint Conference on Neural Networks, vol. 1, pp. 55-58, (Jul. 25, 2004).

Wong et al., "Independent Component Analysis (ICA) for Blind Equalization of Frequency Selective Channels", IEEE 13th Workshop on Neural Networks for Signal Processing, pp. 419-428, (Sep. 17-19, 2003).

* cited by examiner

METHOD AND APPARATUS FOR PERFORMING BLIND SIGNAL SEPARATION IN AN OFDM MIMO SYSTEM

CROSS REFERENCE TO RELATED APPLICATION

This application claims the benefit of U.S. Provisional Application No. 60/795,298 filed Apr. 27, 2006, which is incorporated by reference as if fully set forth.

FIELD OF INVENTION

The present invention is related to wireless communication systems. More particularly, the present invention is related to a method and apparatus for performing blind signal separation in an orthogonal frequency division multiplexing (OFDM) multiple-input multiple-output (MIMO) system.

BACKGROUND

An OFDM MIMO system provides one of the most prominent technologies for high speed wireless communication systems. OFDM MIMO has been adopted for the physical layer of the IEEE 802.11n wireless local area network (WLAN) standard that may support up to 675 Mbps to low mobile users. On the high mobility side, Rev C of CDMA2000 1x evolution-data optimized (1xEV-DO) will be standardized using the OFDM MIMO physical layer to provide up to 73.5 Mbps to high mobility users in a cellular environment.

One of the most fundamental tasks to be performed by the OFDM MIMO receiver is separation of spatial streams. The separation of spatial streams is usually performed with the help of training sequences that are embedded in the transmitted data streams and are known to a receiver. However, the use of training sequences reduces the overall throughput, and usually requires additional processing at both physical and data link layers of the receiver.

Therefore, it would be desirable to provide a method and apparatus for performing blind signal separation in an OFDM MIMO system.

SUMMARY

The present invention is related to a method and apparatus for performing blind signal separation in an OFDM MIMO system. A transmitter generates a plurality of spatial data streams and transmits the spatial data streams via a plurality of transmit antennas. A receiver receives the transmitted spatial data streams with a plurality of receive antennas and generates a plurality of receive data streams. The receiver performs a discrete Fourier transform (DFT) on each of the receive data streams to generate a plurality of frequency domain data streams. The receiver then performs a blind signal separation on the frequency domain data streams to recover spatial streams transmitted by the transmitter. The blind signal separation may be performed by using an independent component analysis (ICA) in the complex domain. The blind signal separation may be performed individually for each OFDM subcarrier.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "transmitter" and "receiver" may be a wireless transmit/receive unit (WTRU), a user equipment (UE), a mobile station, a fixed or mobile subscriber unit, a pager, a cellular telephone, a personal digital assistant (PDA), a computer, or any other type of user device capable of operating in a wireless environment, or a base station, a Node-B, a site controller, an access point (AP), or any other type of interfacing device capable of operating in a wireless environment.

The present invention is applicable to any OFDM MIMO wireless communication systems including, but not limited to, IEEE 802.11n, third generation partnership project (3GPP) long term evolution (LTE), or the like.

Figure 1:
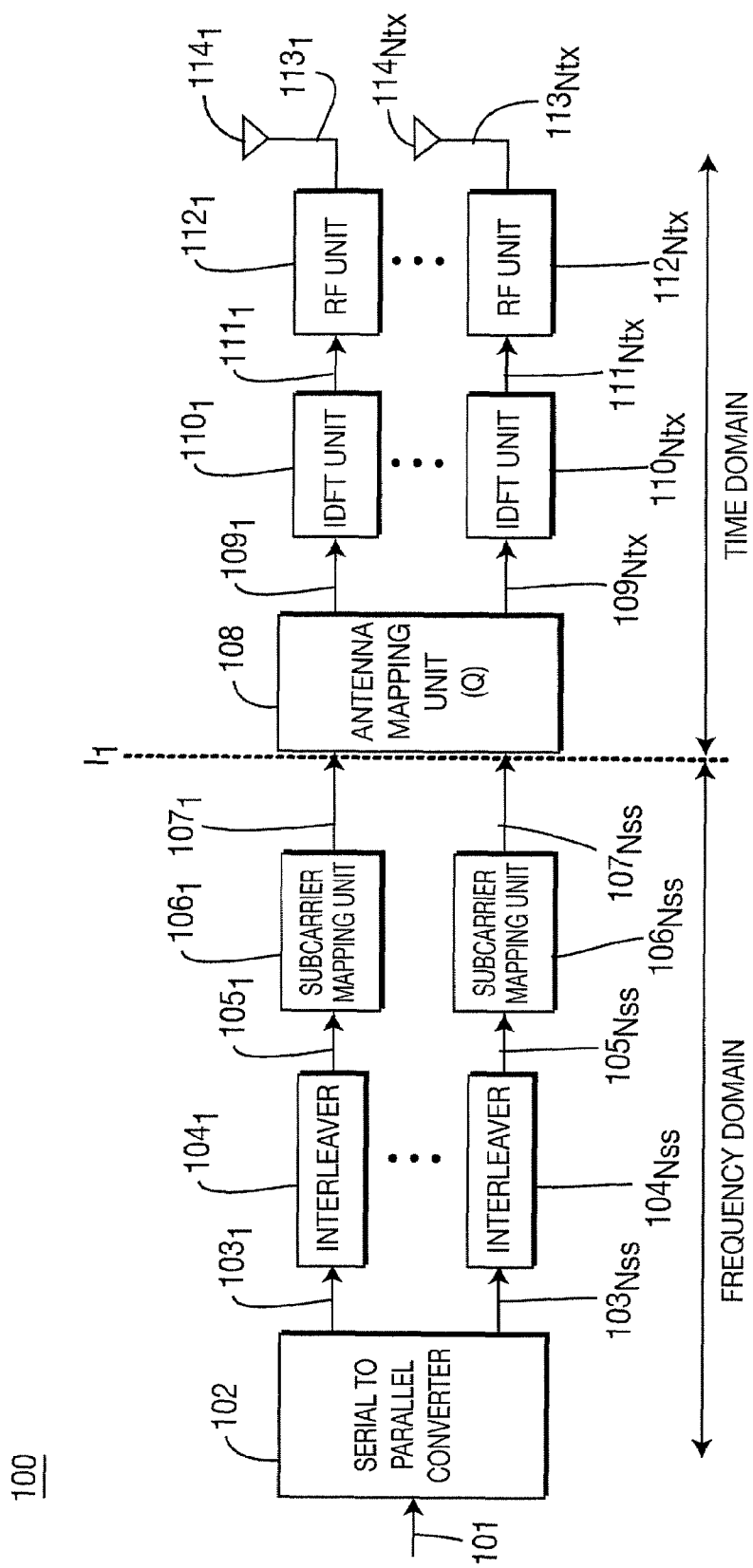
FIG. 1 is a block diagram of an exemplary OFDM MIMO transmitter configured in accordance with the present invention.

FIG. 1 is a block diagram of an exemplary OFDM MIMO transmitter 100 configured in accordance with the present invention. The transmitter 100 includes a serial-to-parallel (S/P) converter 102, a plurality of interleavers $104_1$-$104_{Nss}$, a plurality of subcarrier mapping units $106_1$-$106_{Nss}$, an antenna mapping unit 108, a plurality of inverse discrete Fourier transform (IDFT) units $110_1$-$110_{Ntx}$, a plurality of radio frequency (RF) units $112_1$-$112_{Ntx}$, and a plurality of transmit antennas $114_1$-$114_{Ntx}$. A high speed input data stream 101 is converted to a plurality of low rate data streams $103_1$-$103_{Nss}$, ($N_{ss}$ spatial streams), by the S/P converter 102. Data $103_1$-$103_{Nss}$ in each of the $N_{ss}$ spatial streams is preferably processed by the interleavers $104_1$-$104_{Nss}$, respectively, in order to improve the robustness in a fading environment. The interleaved data $105_1$-$105_{Nss}$ in each of the $N_{ss}$ spatial streams is converted to symbols and mapped onto subcarriers by the subcarrier mapping units $106_1$-$106_{Nss}$.

The subcarrier mapped symbols $107_1$-$107_{Nss}$ in the $N_{ss}$ spatial streams are then processed by the antenna mapping unit 108. The antenna mapping unit 108 outputs $N_{tx}$ transmit data streams $109_1$-$109_{Ntx}$, each of which is mapped to one of the $N_{tx}$ transmit antennas $114_1$-$114_{Ntx}$. In a MIMO system, the number of spatial streams, ($N_{ss}$), is determined as follows: $N_{ss} \leq \min\{N_{tx}, N_{rx}\}$, where $N_{rx}$ is the number of receive antennas in a receiver. The antenna mapping function performed by the antenna mapping unit 108 is represented by an antenna mapping matrix Q. Data $109_1$-$109_{Ntx}$ on each of the $N_{tx}$ transmit data streams is a linear mixing of the symbols $107_1$-$107_{Nss}$ of $N_{ss}$ spatial streams after the subcarrier mapping.

After the antenna mapping, data $109_1$-$109_{Ntx}$ on each of the $N_{tx}$ transmit data streams is converted into time domain data $111_1$-$111_{Ntx}$ by the IDFT units $110_1$-$110_{Ntx}$. The time domain data $111_1$-$111_{Ntx}$ is converted to RF signals $113_1$-$113_{Ntx}$ by the RF units $112_a$-$112_{Ntx}$ and the RF signals transmitted via the transmit antennas $114_1$-$114_{Ntx}$.

Before the interface $I_1$ in FIG. 1, (i.e., before performing antenna mixing), the $N_{ss}$ symbol streams are separated from each other. After the interface $I_1$, the $N_{ss}$ symbol streams may be mixed either by the antenna mapping matrix and the wireless channel, or by the wireless channel only.

Figure 2:
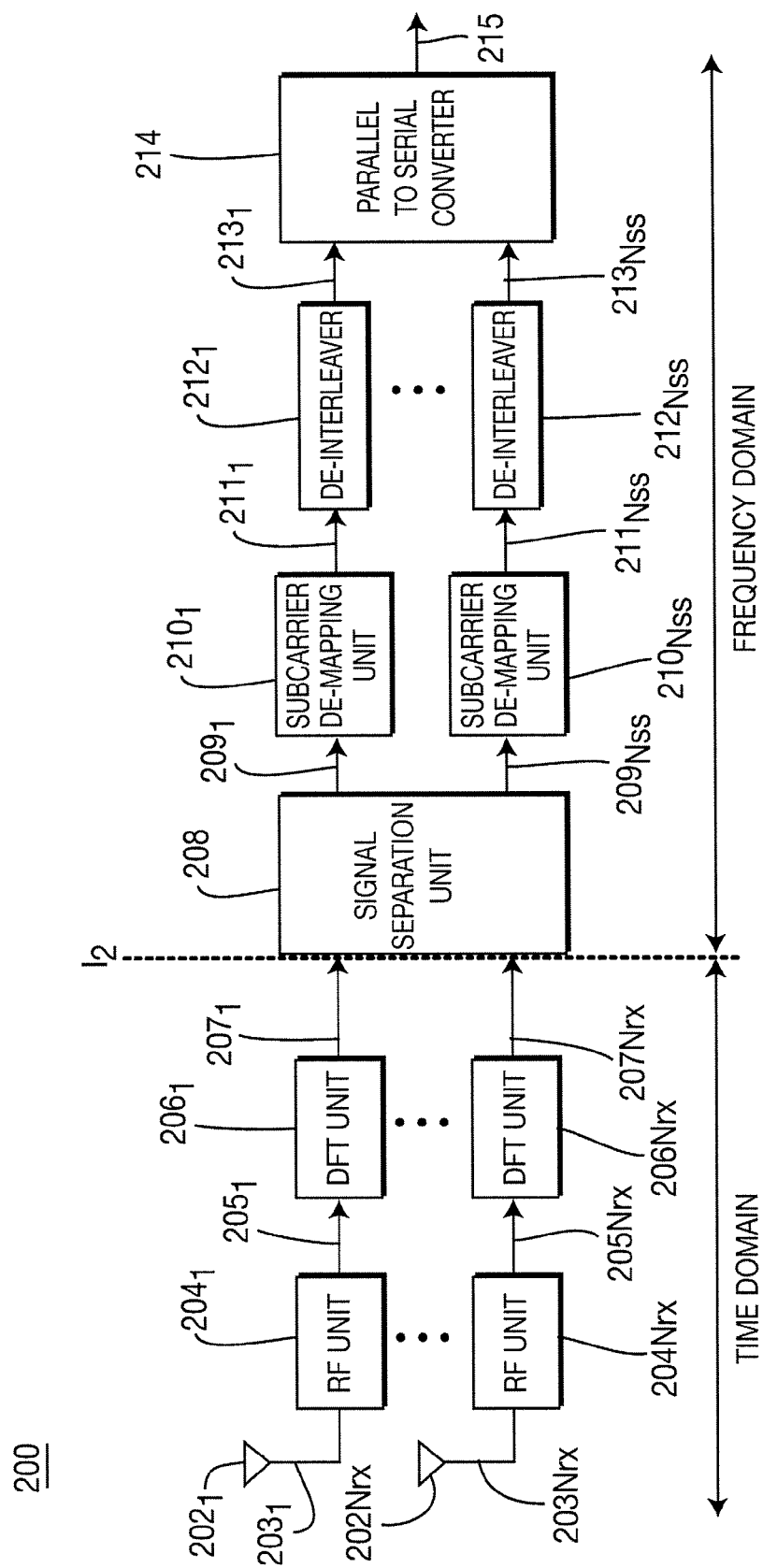
FIG. 2 is a block diagram of an exemplary OFDM MIMO receiver configured in accordance with the present invention.

FIG. 2 is a block diagram of an exemplary OFDM MIMO receiver 200 configured in accordance with the present invention. The receiver 200 includes a plurality of receive antennas $202_1$-$202_{Nrx}$, a plurality of RF units $204_1$-$204_{Nrx}$, a plurality of DFT units $206_1$-$206_{Nrx}$, a signal separation unit 208, a plurality of subcarrier de-mapping units $210_1$-$210_{Nss}$, a plurality of de-interleavers $212_1$-$212_{Nss}$ and a parallel-to-serial (P/S) converter 214.

The RF signals transmitted by the transmitter 100 are detected by the receive antennas $202_1$-$202_{Nrx}$ and a plurality of receive data streams, ($N_{rx}$ receive data streams), are generated. Data $203_1$-$203_{Nrx}$ on the receive data streams is converted to baseband signals $205_1$-$205_{Nrx}$ by the RF units $204_1$-$204_{Nrx}$. The baseband signals $205_1$-$205_{Nrx}$ are then converted to frequency domain data $207_1$-$207_{Nrx}$ by the DFT units $206_1$-$206_{Nrx}$, (i.e., signals on each of a plurality of frequency bins, (i.e., OFDM subcarriers), are obtained for each of the receive data streams by the DFT units $206_1$-$206_{Nrx}$, respectively). The signal on each frequency bin generated by the DFT units $206_1$-$206_{Nrx}$ represents a mixture of the plurality of spatial streams generated and transmitted by the transmitter 100. Those multiple spatial streams are separated by the signal separation unit 208. In accordance with the present invention, the signal separation unit 208 performs blind signal separation to separate multiple spatial streams. The signal separation unit 208 outputs $N_{ss}$ streams of data $209_1$-$209_{Nss}$. Data $209_1$-$209_{Nss}$ on each of the $N_{ss}$ streams is processed by the subcarrier de-mapping units $210_1$-$210_{Nss}$. Subcarrier de-mapped data $211_a$-$211_{Nss}$ is then processed by the de-interleavers $212_1$-$212_{Nss}$. The de-interleaved data $213_1$-$213_{Nss}$ is then merged into one data stream 215 by the P/S converter 214.

The signals during the propagation from interface $I_1$ in FIG. 1 to interface $I_2$ in FIG. 2 exist as linear mixture of the spatial streams in the frequency domain. The mixing coefficients are generated from the coefficients of the antenna mapping in the transmitter 100 and the frequency response of the MIMO channel. For simplicity, the effects of the antenna patterns, transmission and reception chain are assumed as part of the MIMO channel frequency response.

Figure 3:
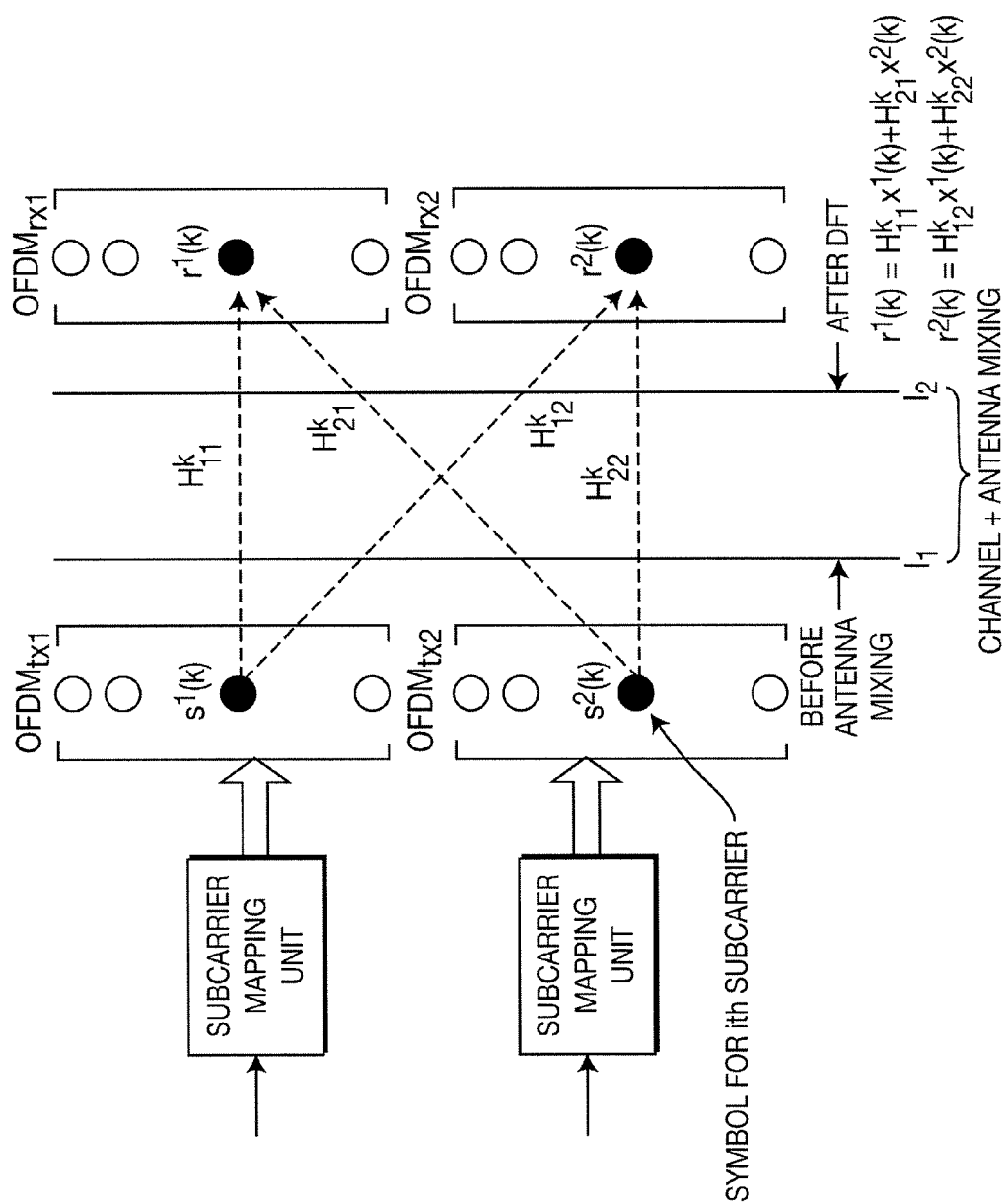
FIG. 3 shows mixing of the signals by the channel and antenna mixing.
Figure 4A:
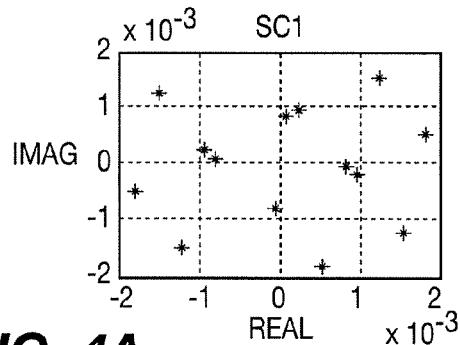
FIGS. 4A-4D show symbols in the first four subcarriers received at the first receive antenna before separation.
Figure 4B:
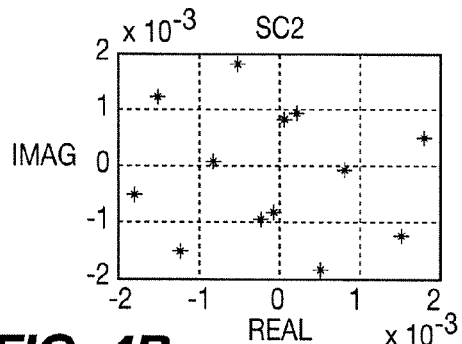
Figure 4C:
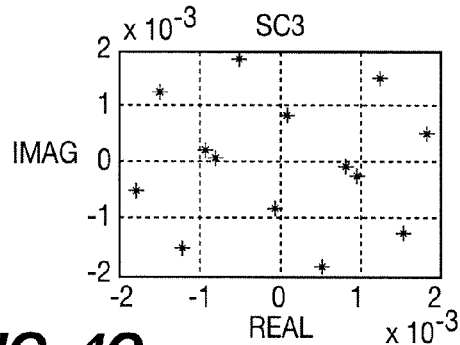
Figure 4D:
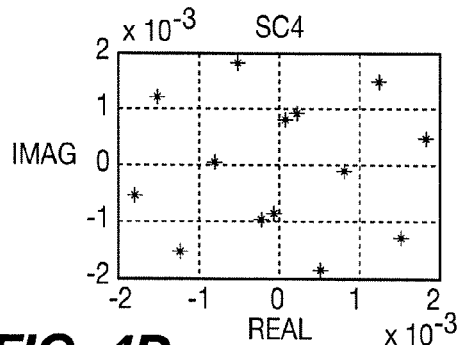
Figure 5A:
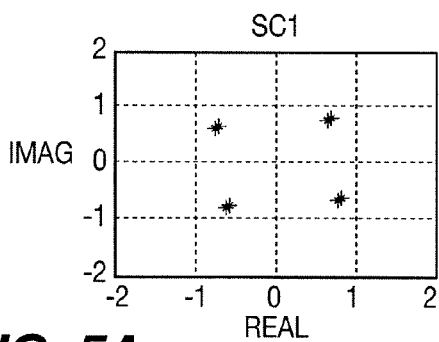
FIGS. 5A-5D show symbols in the first four subcarriers after the ICA separation in accordance with the present invention.
Figure 5B:
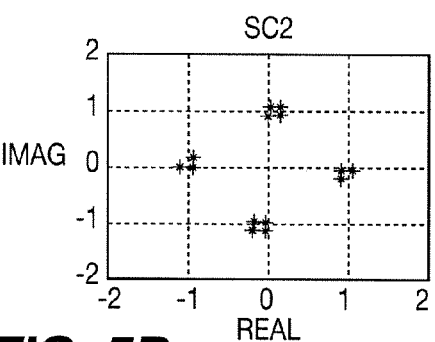
Figure 5C:
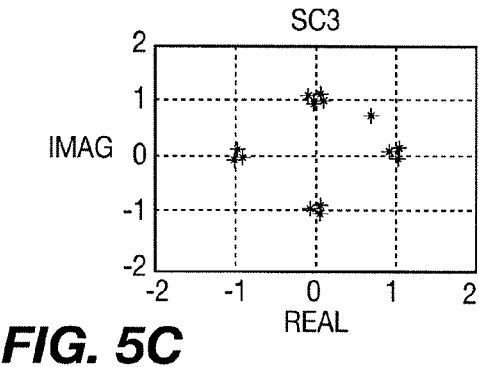
Figure 5D:
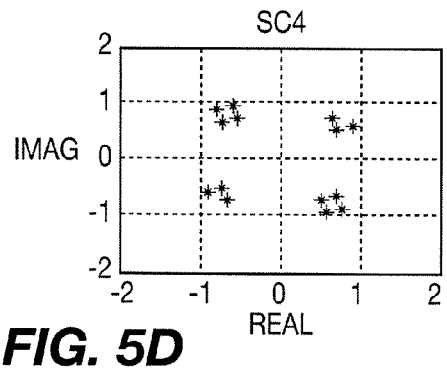

FIG. 3 shows mixing of the signals by the channel and/or antenna mixing. The signal at each frequency bin after DFT processing, (i.e., OFDM subcarrier), on each of the receive data streams at the receiver 200 is a linear combination of the symbols in the corresponding frequency bins of the $N_{ss}$ spatial streams, (after subcarrier mapping), generated by the transmitter 100.

An OFDM symbol of the i-th spatial stream is defined as follows:

$$s^i = [s^i(1)\ s^i(2)\ \ldots\ s^i(N_f)]^T;$$

where $N_f$ is the number of subcarriers.

A received symbol at the j-th receive data stream is defined as follows:

$$r^j = [r^j(1)\ r^j(2)\ \ldots\ r^j(N_f)].$$

For simplicity, it is assumed that the number of transmit data streams and receive data streams are equal to the number of spatial streams, $N_{ss}$. That is, i=1,2,..., $N_{ss}$ and j=1,2,..., $N_{ss}$. From FIG. 3;

$$r^j(k) = \sum_{i=1}^{N_{ss}} H_{ij}^k s^i(k). \qquad \text{Equation (1)}$$

A symbol vector of symbols mapped onto the same subcarrier of the $N_{ss}$ spatial streams is defined as follows for the receiver side and the transmitter side, respectively:

$$r_k = [r^1(k)\ r^2(k)\ \cdots\ r^{N_{ss}}(k)]^T; \text{ and} \qquad \text{Equation (2)}$$

$$s_k = [s^1(k)\ s^2(k)\ \cdots\ s^{N_{ss}}(k)]^T. \qquad \text{Equation (3)}$$

Then;

$$r_k = H^k s_k; \qquad \text{Equation (4)}$$

where $H^k$ is the mixing matrix for the k-th subcarrier, (i.e., frequency bin). The element $H_{ji}^k$ denotes the overall frequency response of the MIMO channel between i-th transmit antenna and j-th receive antenna.

By arranging the vectors given in Equation (4) in a single column vector, $$\begin{bmatrix} r_1 \\ r_2 \\ \vdots \\ r_{N_f} \end{bmatrix} = \begin{bmatrix} H^1 & 0 & \cdots & 0 \\ 0 & H^2 & \cdots & 0 \\ \vdots & & & \vdots \\ 0 & 0 & \cdots & H^{N_f} \end{bmatrix} \begin{bmatrix} s_1 \\ s_2 \\ \vdots \\ s_{N_f} \end{bmatrix}; \qquad \text{Equation (5)}$$

or $$r = Hs; \qquad \text{Equation (6)}$$

where $r \in C^{N_f N_{ss} \times 1}$, $s \in C^{N_f N_{ss} \times 1}$ and $H \in C^{N_f N_{ss} \times N_f N_{ss}}$.

The model in Equation (6) is an ICA model. ICA is a blind signal separation technique in which original signals are separated and restored when a plurality of signals are linearly mixed up by an unknown coefficient. Many algorithms have been developed for performing ICA.

The signal separation unit 208 receives the symbol vector r and estimates the mixing matrix H to separate the transmitted symbols. The linear transformation by the signal separation unit is essentially the inverse of the mixing matrix given in Equation (6). The signal separation unit 208 may directly perform ICA on the received symbol vector r.

Alternatively, the signal separation unit 208 may apply the ICA to each of the subcarrier components individually. The mixing matrix in Equation (5) is block diagonal with the majority of elements of zero. This is the result of the fact that the mixing occurs only on individual OFDM subcarriers. The signals in different OFDM subcarriers are orthogonal and therefore they do not mix. Instead of performing a single ICA in accordance with Equation (5), $N_f$ individual ICA operations may be performed in accordance with Equation (4).

FIGS. 4A-4D and 5A-5D show simulations results. In the simulation, the OFDM MIMO system comprises two spatial streams. Each of the streams includes 64 sub-carriers, (i.e. 64 frequency bins). The frequency separation between the carriers is 312.5 KHz and the overall bandwidth of the OFDM signal is 20 MHz. The channel model is IEEE TGn case B for 5 GHz and a transmitter-receiver separation of 5 m. The modulation is quadrature phase shift keying (QPSK). Before the received signals are passed to the ICA processing, forty (40) OFDM symbols are accumulated. The ICA algorithm used for the separation is the steepest descent ICA with symmetric orthogonalization. The separation is conducted for each of the subcarriers separately. FIGS. 4A-4D show the symbols in the first four subcarriers, (SC1-SC4), of the first received antenna before separation, respectively, while FIGS. 5A-5D show the corresponding symbols obtained after the separation. As shown in FIGS. 5A-5D, the symbols are separated in a successful manner in accordance with the present invention.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for performing blind signal separation in an orthogonal frequency division multiplexing (OFDM) multiple-input multiple-output (MIMO) wireless communication system, the method comprising:
  receiving signals with a plurality of receive antennas and generating a plurality of receive data streams, the received signal being a mixture of a plurality of spatial streams transmitted by a transmitter;
  performing a discrete Fourier transform (DFT) on each of the receive data streams to generate a plurality of frequency domain data streams;
  performing a blind signal separation on the frequency domain data streams to recover the spatial streams in the received signal;
  performing subcarrier de-mapping on the frequency domain data streams;
  de-interleaving the de-mapped frequency domain data streams; and
  merging the de-interleaved frequency domain data streams into one frequency domain data stream.

2. The method of claim 1 wherein the blind signal separation is performed by using an independent component analysis (ICA).

3. The method of claim 2 wherein the blind signal separation is performed by applying a steepest descent ICA with symmetric orthogonalization.

4. The method of claim 1 wherein the blind signal separation is performed individually for each OFDM subcarrier.

5. An orthogonal frequency division multiplexing (OFDM) multiple-input multiple-output (MIMO) receiver for performing blind signal separation, the OFDM MIMO receiver comprising:
  a plurality of receive antennas for receiving signals and generating a plurality of receive data streams;
  a plurality of discrete Fourier transform (DFT) units for performing DFT on each of the receive data streams to generate a plurality of frequency domain data streams;
  a blind signal separation unit for performing a blind signal separation on the frequency domain data streams to recover spatial streams transmitted by a transmitter;
  a plurality of subcarrier de-mapping units for performing subcarrier de-mapping on the frequency domain data streams;
  a plurality of de-interleavers for de-interleaving the de-mapped frequency domain data streams; and
  a parallel to serial converter for merging the de-interleaved frequency domain data streams into one frequency domain data stream.

6. The OFDM MIMO receiver of claim 5 wherein the blind signal separation is performed by using an independent component analysis (ICA).

7. The OFDM MIMO receiver of claim 6 wherein the blind signal separation is performed by applying a steepest descent ICA with symmetric orthogonalization.

8. The OFDM MIMO receiver of claim 5 wherein the blind signal separation is performed individually for each OFDM subcarrier.

* * * * *